United States Patent [19]

Meulnart

[11] Patent Number: 5,495,797
[45] Date of Patent: Mar. 5, 1996

[54] DEVICE FOR AUTOMATICALLY PROCESSING MUSHROOMS AT AN OPTIMUM PROCESSING RATE

[75] Inventor: Alain Meulnart, Paris, France

[73] Assignee: S.A. Royal Champignon, Saumur, France

[21] Appl. No.: 256,987

[22] PCT Filed: Jan. 28, 1993

[86] PCT No.: PCT/FR93/00088

§ 371 Date: Jul. 29, 1994

§ 102(e) Date: Jul. 29, 1994

[87] PCT Pub. No.: WO93/14653

PCT Pub. Date: Aug. 5, 1993

[30] Foreign Application Priority Data

Jan. 31, 1992 [FR] France ..................................... 92 01077

[51] Int. Cl.$^6$ ............................................................. A23N 15/04
[52] U.S. Cl. ..................... 99/637; 99/546; 99/643; 99/491; 209/586
[58] Field of Search .......................... 99/635–642, 485, 99/486, 489, 491, 546, 643; 209/586, 558, 539, 906, 921, 922

[56] References Cited

U.S. PATENT DOCUMENTS

| | | | |
|---|---|---|---|
| 3,164,182 | 1/1965 | Hughes et al. | 99/637 |
| 3,596,693 | 8/1971 | Baker | 99/484 |
| 3,727,542 | 4/1973 | Blanchaud et al. | 99/637 |
| 3,734,004 | 5/1973 | Losito | 99/637 |
| 4,457,434 | 7/1984 | Brown et al. | 209/586 |
| 5,253,765 | 10/1993 | Moorehead et al. | 209/586 |

FOREIGN PATENT DOCUMENTS

| | | | |
|---|---|---|---|
| 2337591 | 8/1977 | France | |
| 2384462 | 10/1978 | France | |
| 2419033 | 11/1979 | France | 99/637 |
| 9102450 | 3/1991 | WIPO | |

*Primary Examiner*—Timothy F. Simone
*Attorney, Agent, or Firm*—Jacobson, Price, Holman & Stern

[57] ABSTRACT

A device for automatically processing mushrooms of given caliber Cal, the device including conveyor means (10, 20, 30) designed to bring said mushrooms to at least one processing station ($100_i$) including detection means ($110_i$) suitable for determining a parameter relating to each mushroom, a processing member ($120_i$) for processing the mushrooms individually over a given processing distance $C_i$, and control means ($130_i$) suitable for bringing the processing member ($120_i$) into operation after a response time $Tr_i$ and as a function of the parameter determined by said detection means ($110_i$). According to the invention, said conveyor means include a "receiver" first set of belts (10) designed to receive the mushrooms at a given mean rate D not greater than $\min[1/Tr_i]$ and driven at a speed $V_0$ not less than Cal×D, an "accumulator" second set of belts (20) driven at a speed $V_1$ selected to be substantially equal to Cal×D, and a "separator" third set of belts (30) driven at a speed $V_2$ selected to be not less than $\max[C_i/[1/D-Tr_i]]$.

4 Claims, 1 Drawing Sheet

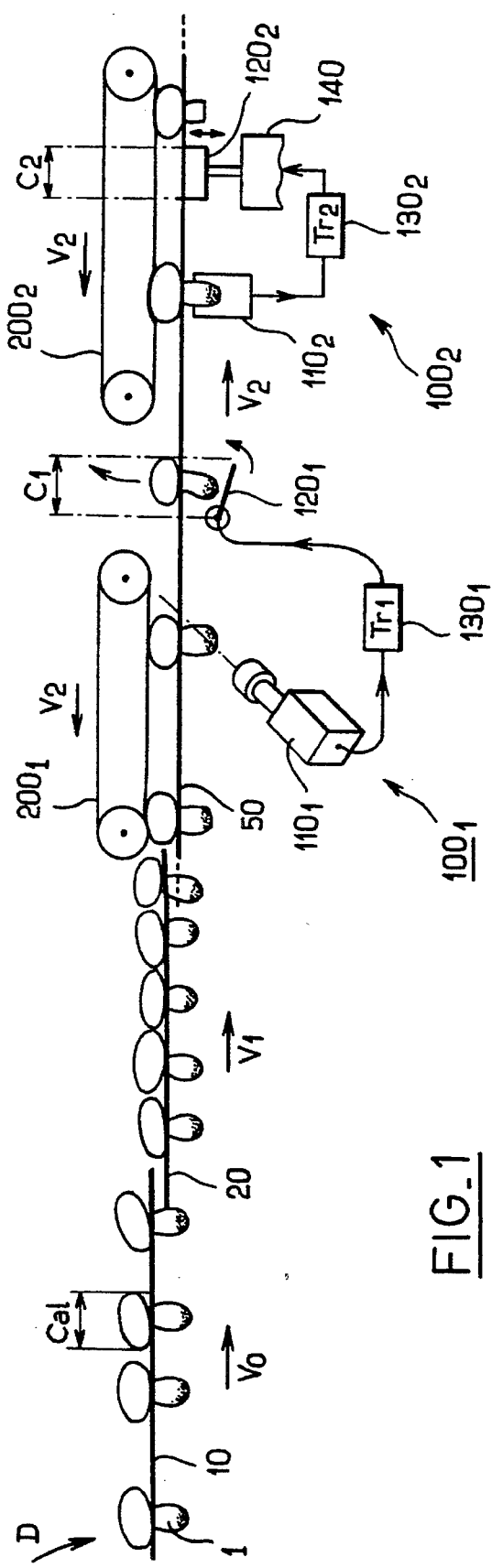
FIG_1

DEVICE FOR AUTOMATICALLY PROCESSING MUSHROOMS AT AN OPTIMUM PROCESSING RATE

The present invention relates to a device for automatically processing mushrooms.

A particularly advantageous application of the invention lies in the field of trimming cultivated mushrooms, in particular prior to preserving them.

French patent application No. 91 07782 in the name of the Applicant discloses an automatic mushroom-processing device constituted by a mushroom stem cutting installation comprising conveyor means designed to bring said mushrooms to a cutting station that includes a cutting member for trimming the mushrooms individually. In that known installation, said cutting station includes detector means, e.g. an optical pattern recognition device suitable for determining the length of the stem of each mushroom. Control means are also provided to adjust the relative position of the cutting member and of the mushroom stem as a function of the stem length as determined by said detection means. Naturally, the above adjustment operation does not happen instantaneously but requires a certain amount of time, referred to as the response time Tr, which time separates the instant at which the mushroom is taken into account by the detection means and the instant at which the cutting member reaches the cutting position corresponding to the length of the stem of said mushroom. By way of example, the cutting member used may be constituted by two coplanar saw blades rotating in opposite directions. In general, the cutting member presents a certain trimming distance C defined as being the distance travelled by a mushroom between the moment cutting begins and the moment cutting ends.

The conveyor means are fed with mushrooms by a feed device that provides calibrated mushrooms of given caliber Cal at a given mean rate D. The term "caliber" is used to designate the mean value of a given range of mushroom cap diameters.

The conveyor means in the installation known in the state of the art make use of at least one set of belts, and more particularly they make use of two successive sets of belts in which the second set is faster than the first set so as to increase the distance between two consecutive mushrooms in order to leave the cutting member with enough space to move between the stems of said two consecutive mushrooms, given the trimming distance C.

Naturally, in general manner, a device for automatically processing mushrooms may include processing stations other than a cutting station, e.g. a station for ejecting out-of-specification mushrooms, each processing station being defined by a response time $Tr_i$ and a processing distance $C_i$, where $i$ lies in the range 1 to the number N of stations. The mushroom conveyor means of the processing device are then subjected to constraints of two types:

the mushrooms must be processed one by one, which means that there can be only one mushroom present over the processing distance $C_i$ of each processing station; and the time interval between two mushrooms must be sufficient to allow each processing member, given its response time $Tr_i$, to be controlled by said respective control means before the said mushroom is presented to said processing member.

By an appropriate choice of belt speeds, the above-described cutting installation can satisfy both the above conditions, however, particularly when fed manually, it does not always make it possible to obtain a regular stream of mushrooms in the sense that for a given average rate D, the space or time interval between two consecutive mushrooms can be too small to satisfy the above-specified conditions.

Thus, the object of the present invention is to propose a device for automatically processing mushrooms of given caliber Cal, the device including conveyor means designed to bring said mushrooms to at least one processing station including detection means suitable for determining a parameter relating to each mushroom, a processing member for processing the mushrooms individually over a given processing distance $C_i$, and control means suitable for bringing the processing member into operation after a response time $Tr_i$ and as a function of the parameter determined by said detection means, which device which makes it possible to satisfy both of the above-specified constraints and simultaneously to ensure a regular stream of mushrooms through the cutting station.

According to the invention, this object is achieved by the fact that said conveyor means include a "receiver" first set of belts designed to receive the mushrooms at a given mean rate D not greater than $\min[1/Tr_i]$ and driven at a speed $V_0$ not less than Cal×D, an "accumulator" second set of belts driven at a speed $V_1$ selected to be substantially equal to Cal×D, and a "separator" third set of belts driven at a speed $V_2$ selected to be not less than $\max[C_i/[1/D-Tr_i]]$.

Thus, the speed $V_1$ of the accumulator belts is such that the mushrooms take up positions on said belts substantially cap against cap, thus with a separation distance that is relatively regular and equal to the caliber of the mushrooms. Further, as explained in detail below, the mushroom throughput rate D and the speed $V_2$ of the separator belts as defined above make it possible to achieve the two basic conditions outlined above.

In order to ensure that these conditions continue to be satisfied all along the separator belts while, in particular, avoiding any possible slip of the mushrooms, provision is made for the device of the invention also to include at least one presser belt on the path of said separator belts and running at the speed $V_2$ for the purpose of holding said mushrooms against said separator belts.

The following description made with reference to the accompanying drawing is given by way of non-limiting example and makes it easy to understand what the invention consists in and how it can be implemented.

FIG. 1 is a side view of an automatic mushroom processing device of the invention.

FIG. 1 is a diagram of a device for automatically processing mushrooms. The device is fed with mushrooms of given caliber Cal that may lie on average in the range 15 mm to 60 mm, which mushrooms are fed by feed means (not shown) at a given mean rate D, e.g. ten mushrooms per second.

The automatic processing device shown in FIG. 1 includes means 10, 20, 30 for conveying mushrooms towards an ejection first station 100₁ including detection means 110₁ constituted in the embodiment shown in FIG. 1 by a camera that serves, for example, to determine the shape of each mushroom, an ejection member 120₁ for ejecting mushrooms individually over an ejection distance $C_1$, and control means 130₁ suitable for bringing the ejection member 120₁ into operation after a response time $Tr_i$ if the shape of the mushroom as determined by the camera 110₁ does not satisfy a given standard. The ejection station 100₁ is followed by a cutting second station 100₂ analogous to that described in French patent application No. 91 07782. In the example shown in FIG. 1, the cutting station 100₂ comprises detection means 110₂, e.g. constituted by an optical sensor. The purpose of this detection means is to determine the length of the stem of each mushroom. The cutting station 100₂ also includes a cutting member 120₂ for trimming the mushrooms individually over a given trimming distance $C_2$. The cutting member $120_2$ of FIG. 1 is constituted by two coplanar circular saws rotating in opposite directions under drive from a motor 140. In this case, the trimming distance $C_2$ is subsequently equal to the cutting depth of the saws, i.e. about 35 mm in a particular embodiment implemented by the Applicant. Control means $130_2$ are also provided for operating with a response time $Tr_2$ to adjust the relative position of the cutting member $120_2$ and the stem 1 of the mushroom as a function of the length of the stem as determined by said detection means $110_2$, in the manner described in the above-mentioned patent application.

As can be seen in FIG. 1, the mushroom conveyor means comprise a first set of belts 10 referred to as receiver belts that are designed to receive said mushrooms at the mean rate D. The speed $V_0$ of said receiver belts 10 is adjusted so as to conserve the feed rate. For that purpose, it is advantageous for the mean distance between two consecutive mushrooms, i.e. $V_0/D$ should be not less than the caliber Cal of the mushrooms. From that it can be deduced that $V_0$ must be not less than Cal×D. For a caliber of 40 mm and a mean rate D of ten mushrooms per second, it can be deduced:

$$V_0 \geq 0.4 \text{ meters per second (m/s)}$$

In practice, $V_0$ is selected to be greater than 0.6 m/s so as to ensure that the mushrooms are taken hold of properly, and given the irregularities in the stream, thereby ensuring that the mushrooms are far enough apart to avoid getting in each other's way. Similarly, the speed $V_0$ should be less than 1 m/s, for example, so as to avoid subjecting the mushrooms to shocks that are too rough and so as to limit the length of the receiver belts.

In general, the mushrooms arrive on the first set of belts in irregular manner. Thus, in order to remedy this drawback, the mushrooms are accumulated on a second set of belts 20 referred to as accumulator belts and driven at a speed $V_1$ that is suitable for providing a regular stream of mushrooms, i.e., in practice, mushrooms placed cap against cap along said accumulator belts 20. Consequently, to achieve this condition, $V_1$ must be selected close to Cal×D, i.e.:

$$V_1 \approx 0.4 \text{ m/s}$$

If perfect accumulation is to be provided, then the speed $V_1$ must be slightly less than Cal×D even at the risk of slowing down the mushroom throughput rate and of clogging the inlet to the accumulator belts 20. In contrast, if $V_1$ is a little greater than Cal×D, then it is possible to maintain the initial rate D while the mushrooms are being conveyed by the second set of belts, however this is to the detriment of obtaining a rate that is regular.

Finally, a third set of belts 30, referred as separator belts, is driven at a speed $V_2$ selected to satisfy the two constraints recalled above. These constrains can be expressed as follows:

$$V_2/D \geq C_1 + V_2 \times Tr_1 \qquad V_2/D \geq C_2 + V_2 \times Tr_2$$

i.e.:

$$V_2 \geq C_1/[1/D - Tr_1] \qquad V_2 \geq C_2/[1/D - Tr_2]$$

or overall $V_2 \geq \text{Max}[C_i/[1/D - Tr_i]]$ for $i = 1, 2, \ldots$ with the additional conditions $$1/D - Tr_1 \geq 0 \text{ and } 1/D - Tr_2 \geq 0$$

giving $$D \geq \min[1/Tr_i]$$

e.g., with a maximum response time of 0.70 ms it is necessary to have $D \geq 4$ mushrooms per second which is satisfied by D=10 mushrooms per second.

For a maximum processing distance of 35 mm, for example, this gives:

$$V_2 \geq 1.17 \text{ m/s}$$

The automatic processing device described above makes it possible to obtain a regular and optimum throughput rate of mushrooms. In order to communicate the speed $V_2$ of the separator belts to the mushrooms, and to maintain this rate in spite of risks of jamming, e.g. against the slideways that serve to guide the belts, and also against slip to which the mushrooms may be subjected at the moment they are accelerated by the separator belts 30, the device of the invention also includes, as shown in FIG. 1, two presser belts $200_1$ and $200_2$ overlying the path of the separator belts and running at the speed $V_2$ for the purpose of holding said mushrooms against said separator belts. Advantageously, the presser belts are made of a foam type plastics material.

I claim:

1. A device for automatically processing mushrooms comprising:

a) conveyor means for bringing mushrooms fed to the device to b) at least one processing station that includes (i) detection means for determining mushroom size, (ii) a processing member for processing each mushroom individually for a distance C, and (iii) control means for bringing the processing member into operation at a time Tr following detection-means determination of mushroom size and in a manner based on mushroom size as determined by the detection means, wherein the device is suitable for processing mushrooms having a mean cap diameter Cal, which are fed to the device at a mean mushroom-flow rate D not greater than 1/Tr, and wherein the conveyor means includes a set of receiver belts for receiving mushrooms fed to the device, which can be driven at a speed $V_0$ not less than Cal×D, and a set of accumulator belts, which can be driven at a speed $V_1$ equal to Cal×D and a set of separator belts, which can be driven at a speed $V_2$ not less than C/(1/D−Tr).

2. The device of claim 1 further comprising at least one presser belt running parallel with and at the same speed as the separator belts for holding the mushrooms against the separator belts.

3. The device according the claim 1 including a processing station for cutting stems of the mushrooms, wherein the detection means can determine the length of each mushroom stem, the processing member is a cutting member that can trim each mushroom individually, and the control means can adjust the relative positions of the cutting member and the mushroom stem based on the stem length determined by the detection means.

4. The device according to the claim 2 including a processing station for cutting stems of the mushrooms, wherein the detection means can determine the length of each mushroom stem, the processing member is a cutting member that can trim each mushroom individually, and the control means can adjust the relative positions of the cutting member and the mushroom stem based on the stem length determined by the detection means.

* * * * *